United States Patent [19]
Gyotoku et al.

[11] Patent Number: 5,712,340
[45] Date of Patent: Jan. 27, 1998

[54] AQUEOUS DISPERSION OF POLYMER COMPOSITION

[75] Inventors: Hiroaki Gyotoku; Satoshi Kuriyama; Kaoru Murata; Tatsuya Ohsumi, all of Kyoto, Japan

[73] Assignee: Sanyo Chemical Industries, Ltd., Kyoto, Japan

[21] Appl. No.: 612,854

[22] PCT Filed: Aug. 8, 1994

[86] PCT No.: PCT/JP94/01308

§ 371 Date: Feb. 26, 1996

§ 102(e) Date: Feb. 26, 1996

[87] PCT Pub. No.: WO95/09203

PCT Pub. Date: Apr. 6, 1995

[30] Foreign Application Priority Data

Sep. 27, 1993 [JP] Japan ..................... 5-264204

[51] Int. Cl.$^6$ ................. C08J 3/00; C08K 3/20; C08K 3/10; C08L 33/00
[52] U.S. Cl. .......... 524/521; 523/406; 523/408; 523/409; 523/411; 524/515; 524/522; 524/523; 524/547; 525/72; 525/100; 525/101; 525/108
[58] Field of Search ................. 523/406, 408, 523/409, 411; 524/515, 521, 522, 523, 547; 525/72, 100, 101, 108

[56] References Cited

U.S. PATENT DOCUMENTS 5,306,735  4/1994  Kuriyama et al. ............. 524/547

FOREIGN PATENT DOCUMENTS 61-9463  1/1986  Japan.
5-25354  2/1993  Japan.

*Primary Examiner*—Patrick Niland
*Attorney, Agent, or Firm*—Merchant, Gould, Smith, Edell, Welter & Schmidt, P.A.

[57] ABSTRACT

The present invention relates to an aqueous dispersion of a polymer composition comprising (A) a copolymer which comprises ($a_1$) a unit derived from a vinyl monomer having a hydrolyzable silyl group and ($a_2$) a unit derived from another vinyl monomer copolymerizable with ($a_1$), and (B) a water-soluble polymer having an amineimide group. The aqueous dispersion of the present invention has good polymerization stability, mechanical stability and storage stability, and is useful in various applications such as coating materials, paints, adhesives, primers and binders.

17 Claims, No Drawings

AQUEOUS DISPERSION OF POLYMER COMPOSITION

TECHNICAL FIELD

The present invention relates to a highly stable emulsion or aqueous dispersion of copolymer having a hydrolyzable silyl group.

BACKGROUND ART

Among coating compositions for paints, aqueous solution-based ones are replacing solvent solution-based ones in consideration of low-pollution, resource conservation, safety and sanitation. Research has been actively conducted on reactive emulsions, which are expected to provide improved properties including water resistance. Resin emulsions having a hydrolyzable silyl group are known as one kind of the reactive emulsions. For example, an aqueous dispersion of copolymer having a hydrolyzable silyl group, which is obtained by copolymerizing a polymerizable monomer having a hydrolyzable silyl group and methacrylate in a conventional emulsifier such as lauryl sodium sulfate, is disclosed in Japanese Patent Application Laid-Open No. 61-9463. A method of producing the dispersion using a radical-polymerizable emulsifier is also known. Further, an aqueous dispersion of a vinyl polymer having a hydrolyzable silyl group and an aminimide group in a molecule is disclosed in the recent U.S. Pat. No. 5,306,765.

Nevertheless, when a conventional non-polymerizable emulsifier is used, the storage stability becomes insufficient. Also, an emulsion of a resin having a hydrolyzable silyl group produced with a radically polymerizable emulsifier has a good storage stability only when it contains a small amount of a hydrolyzable silyl group, but as the amount increases the storage stability deteriorates and the problem of polymerization stability occurs, such as the generation of gel at the time of polymerization. Besides, the emulsion's mechanical stability is insufficient. The mechanical stability denotes an aqueous dispersion's resistance to the phenomenon where the dispersed state is destroyed and the dispersoid aggregates when a physical force such as stirring or vibration is applied to the aqueous dispersion.

The inventors of the present invention achieved the present invention by seeking to obtain an emulsion or an aqueous dispersion (hereinafter described as dispersion) of a polymer having a hydrolyzable silyl group, which has excellent polymerization stability, mechanical stability and storage stability even when the amount of a hydrolyzable silyl group contained therein is high.

DISCLOSURE OF INVENTION

The present invention relates to an aqueous dispersion of polymer composition having a hydrolyzable silyl group, comprising (A) a copolymer which comprises ($a_1$) a unit derived from a vinyl monomer having a hydrolyzable silyl group and ($a_2$) a unit derived from another vinyl monomer copolymerizable with ($a_1$) and (B) a water-soluble polymer having an amineimide group.

BEST MODE FOR CARRYING OUT THE INVENTION

In this invention, examples of a hydrolyzable silyl group of ($a_1$) vinyl monomer include a halogenosilyl group (examples of a halogen include chlorine and bromine), an acyloxysilyl group (with an acyloxy group of from 1 to 17 carbon atoms), an amidosilyl group (where R of the RCONH— group is an alkyl group of from 1 to 17 carbon atoms), an aminoxysilyl group (where $R^1$ and $R^2$ of the $R^1R^2NO$— group are an alkyl group of the same or different number of carbon atoms from 1 to 8), an alkenyloxysilyl group (with an alkenyl group of from 3 to 8 carbon atoms), an aminosilyl group (where $R^1$ and $R^2$ of the $R^1R^2N$— group are hydrogen or an alkyl group of from 1 to 8 carbon atoms, and $R^1$ and $R^2$ may either be the same or different), an alkylideneiminooxysilyl group (with an alkylidene group of from 2 to 8 carbon atoms), an alkoxysilyl group (with an alkoxy group of from 1 to 18 carbon atoms) and a thioalkoxysilyl group (with an alkoxy group of from 1 to 18 carbon atoms). Among them, an alkoxysilyl group is preferable.

Examples of ($a_1$) include those disclosed in the U.S. Pat. No. 5,306,765 or the Japanese Patent Application Laid-Open No. 5-25354 such as vinyl silanes (vinyl methyl dimethoxy silane, vinyl trimethoxy silane, vinyl triethoxy silane, vinyl tris(β-methoxy ethoxy) silane, etc.); and (meth)acryloxy alkyl silanes (γ-methacryloxy propyl trimethoxy silane, γ-methacryloxy propyl methyl dimethoxy silane, γ-acryloxy propyl trimethoxy silane, γ-methacryloxy propyl methyl diethoxy silane and γ-acryloxy propyl triethoxy silane, etc.). In this invention, "(meth)acryloxy . . . " denotes an "acryloxy . . . " or "methacryloxy . . . ". The same can be applied hereinafter.

($a_1$) also includes oligomers having at least one vinyl group and at least one hydrolyzable Silyl group at an end or a side chain. For instance, oligomers having a polymer chain of comparatively low molecular weight such as polyurethane chain, polyamide chain, epoxy resin chain and polyester chain between a vinyl group and a hydrolyzable silyl group are included. More concretely, as disclosed in the U.S. Pat. No. 5,306,765 or the Japanese Patent Application Laid-Open No. 60-26022, polyurethane oligomers having a vinyl group and an alkoxysilyl group (a reaction product of 1 mole of NCO-terminated compound which is derived from polycaprolactone triol (having a molecular weight as measured by the number of hydroxyl group of 2,000) and isophorone diisocyanate, 1 mole of 2-hydroxyethyl methacrylate and 2 moles of γ-aminopropyl trimethoxy silane); polyester oligomers of polycaprolactone diol (having a molecular weight as measured by the number of hydroxyl group of 5,000) with one end (hydroxyl group) esterificated by (meth)acrylic acid and the other end (hydroxyl group) provided with a hydrolyzable silyl group by the reaction with isocyanatopropyl triethoxy silane; polyamide oligomers obtained by the reaction of a polyamide resin having an amino group with glycidyl methacrylate and a silane coupling agent having an epoxy group; epoxy oligomers obtained by the reaction of an addition condensate of bisphenol-A and epichlorohydrin with methacrylate having a secondary amino group and a silane coupling agent having an amino group. These can be used alone or as a mixture of two or more kinds. Among these monomers, (meth)acryloxyalkyl silane is prefereble, and (meth)acryloxyalkylalkoxy silane and polyurethane oligomers having a vinyl group and a alkoxysilyl group are more preferable.

($a_2$) is not particularly limited but the polymerizable monomers described in the below mentioned items (i) to (xv) are included.

(i) alkyl(meth)acrylate or cycloalkyl(meth)acrylate having an alkyl group of from 1 to 30 carbon atoms or a cycloalkyl group of from 5 to 7 carbon atoms Examples of (i) include methyl (meth)acrylate, ethyl (meth)acrylate, propyl (meth)acrylate, butyl (meth)acrylate, octyl (meth)acrylate, lauryl (meth)acrylate, stearyl (meth) acrylate, behenyl (meth)acrylate and cyclohexyl (meth) acrylate.

In the present invention, "(meth)acryl..." denotes "acryl..." "methacryl...". The same can be applied hereinafter.

(ii) vinyl monomers containing a hydroxyl group

Examples of (ii) include 2-hydroxyethyl (meth)acrylate, 2-hydroxypropyl (meth)acrylate, 3-hydroxypropyl (meth) acrylate, and (meth)acrylic monoester of diethylene glycol.

(iii) aromatic vinyl monomers

Examples of (iii) include styrene.

(iv) alkyl or cycloalkyl vinylethers

Examples of (iv) include methyl vinylether.

(v) vinyl esters

Examples of (v) include vinyl acetate.

(vi) monomers having a nitrile group

Examples of (vi) include acrylonitrile (vii) monomers having an amide group

Examples of (vii) include (meth)acrylamide.

(viii) vinyl monomers having an epoxy group

Examples of (viii) include glycidyl (meth)acrylate.

(ix) vinyl monomers having a siloxane group

Examples of (ix) include compounds represented by the formula: $CH_2=C(CH_3)COO(CH_2)_3(Si(CH_3)_2O)_nSi(CH_3)_3$ (wherein n is an integer ranging from 1 to 130).

(x) vinyl monomers having a perfluoroalkyl group of from 3 to 30 carbon atoms

Examples of (x) include:

(meth)acrylates having a perfluoroalkyl group, such as: $CF_3(CF_2)_9(CH_2)_2OCOCH=CH_2$, mono- or di- ester of maleic acid having a perfluoroalkyl group, such as: $C_8F_{17}(CH_2)_{11}OCOCH=CHCOOCH_3$, olefins having a perfluoroalkyl group, such as: $C_7F_{15}CH_2CH=CH_2$, vinyl ethers or allyl ethers having a perfluoroalkyl group, such as: $C_7F_{15}CH_2OCH=CH_2$, and vinyl sulfones having a perfluoroalkyl group, such as: $C_8F_{17}SO_2NHCH_2SO_2CH=CH_2$.

(xi) vinyl monomers having an amino group

Examples of (xi) include N,N-dimethylaminoethyl (meth) acrylate, N,N-dimethylaminoethyl (meth)acrylamide, and salts thereof (such as organic acid salts and inorganic acid salts).

(xii) vinyl monomers having a carboxylic group

Examples of (xii) include (meth)acrylic acid, maleic acid, fumaric acid, itaconic acid, and salts thereof (such as alkali metal salts, alkali earth metal salts, ammonium salts and amine salts).

(xiii) vinyl monomers having a sulfonic acid group

Examples of (xiii) include vinyl sulfonic acid, (meth)acryl sulfonic acid, styrene sulfonic acid, and salts thereof (such as alkali metal salts, alkali earth metal salts, ammonium salts and amine salts).

(xiv) polyvinyl monomers

Examples of (xiv) include divinyl monomers (such as divinylbenzene, diallyl phthalate, 1,6-hexanediol di(meth) acrylate, ethylene glycol di(meth)acrylate), trivinyl monomers (such as trimethylol propane tri(meth)acrylate), tetra vinyl monomers (such as pentaethrito tetra(meth) acrylate).

(xv) polymerizable oligomers having a vinyl group

Examples of (xv) include oligomers such as a polyurethane moiety, a polyamide moiety, an epoxy resin moiety and a polyester moiety having at least one polymerizable double bond introduced. Esters of polycaprolactonediol and (meth)acrylic acid (for example, "PRACCEL FM-1" manufactured by Nippon Oil and Fats Co., Ltd.), a reaction product of 1 mole of OH-terminated prepolymer from poly(tetramethylene glycol) and isophorone diisocyanate and 1 mole of isocyanatoethyl acrylate, a reaction product of polyamide having an amino group and (meth)acrylate and a reaction product of epoxy resin and acrylic acid can be used.

These can be used alone or as a mixture of two or more kinds. Among these monomers, (i) and (iii) are preferable, and methyl (meth)acrylate, n-butyl (meth)acrylate, 2-ethylhexyl (meth)acrylate and styrene are more preferable.

The weight ratio of a unit derived from ($a_1$) and a unit derived from ($a_2$) in a copolymer (A) is in the range of 0.5:99.5 to 50:50. If the weight ratio of ($a_1$) is less than 0.5 by weight, since the curing becomes insufficient, the water resistance or acid resistance of the paint film will deteriorate, while when the weight ratio of ($a_1$) exceeds 50, the storage stability will decline. The copolymer (A) has a weight-average molecular weight of, in general, from 10,000 to 2,000,000, preferably 100,000 to 1,000,000.

Examples of a water-soluble polymer (B) include polymers comprising units derived from ($b_1$) a vinyl monomer having an amineimide group, or copolymers comprising a unit derived from ($b_1$) the vinyl monomers and a unit derived from ($b_2$) vinyl monomers without an amineimide group. The water-soluble polymer (B) has a weight-average molecular weight of, in general, from 1,000 to 100,000, preferably 3,000 to 50,000. The water-soluble polymer (B) can be produced by a conventional radical polymerization method.

Examples of ($b_1$) vinyl monomers having an amineimide group include those described in the U.S. Pat. No. 5,306,765 and the Japanese Patent Application Laid-Open No. 5-25354 such as 1,1,1-trimethylamine methacrylimide, 1,1-dimethyl-1-ethylamine methacrylimide, 1,1-dimethyl-1-(2-hydroxypropyl)amine methacrylimide, 1,1-dimethyl-1-(2'-phenyl-2'-hydroxyethyl)amine methacrylimide, 1,1-dimethyl-1-(2'-hydroxy-3'-phenoxypropyl)amine methacrylimide and 1,1,1-trimethylamine acrylimide. Among these monomers, 1,1,1-trimethylamine methacrylimide and 1,1-dimethyl-1-(2-hydroxypropyl)amine methacrylimide are preferable.

Examples of ($b_2$) the vinyl monomers without an amineimide group include those described as examples of ($a_1$) or ($a_2$), and vinyl monomers having a hydroxyl group, vinyl monomers having an amino group, vinyl monomers having a carboxylic group and vinyl monomers having a sulfonic acid group are preferable. In particular, use of a combination of monomers of (xi) and (xii) or (xiii) together, or a combination of monomers of (ii) and any one of (xi), (xii) and (xiii) is preferable with respect to the polymerization stability. The weight ratio of ($b_2$) a vinyl monomer without an amineimide group to ($b_1$) a vinyl monomer having an amineimide group is in the range of 0 to 50:1, preferably 0.5 to 20:1.

The weight ratio of the copolymer (A) and the water-soluble polymer (B) is, in general, in the range of from 99.5:0.5 to 50:50, preferably 98:2 to 70:30.

If the weight ratio of (B) is less than 0.5 the polymerization stability and the storage stability will decline, while when the weight ratio exceeds 50, the water resistance or weathering resistance of the paint film will deteriorate.

The aqueous dispersion of the present invention may include (C) a non-radically polymerizable compound having a hydrolyzable silyl group and/or (D) a polyepoxide compound having at least two epoxy groups per one molecule to improve the film curing ability or water resistance and film formation property.

(C) a non-radically polymerizable compound having a hydrolyzable silyl group reacts with a hydrolyzable silyl group in a copolymer (A) in the process of film formation from the aqueous dispersion in the present invention to improve curing ability or water resistance. A polyepoxide compound (D) weakens curing shrinkage caused by a rapid reaction of a hydrolyzable silyl group at the time of coating and heat-curing the aqueous dispersion of the present invention to improve film formation property. Further, when (A) and/or (B) has a functional group that can react with an epoxy group (such as a carboxyl group), (D) improves the film's water resistance by reacting with the functional group.

Examples of (C) non-radically polymerizable compounds having a hydrolyzable silyl group include silane monomers (such as methyl trimethoxy silane and methyl triethoxy silane); compounds having an epoxy group (such as 2-(3', 4'-epoxy cyclohexyl)ethyl trimethoxy silane, 3-(trimethoxy silyl)propyl glycidyl ether, bis(2'3'-epoxy propyl oxypropyl) dimethoxy silane, tris(2'3'-epoxy propyl oxypropyl)methoxy silane); compounds having a thiol group (such as 3-(trimethoxy silyl)propanethiol and 3-(methyl dimethoxy silyl)propanethiol); compounds having an amino group (such as 3-triethoxy propylamine, N-(3'-trimethoxy silyl propyl)ethylene diamine and N-(3'-trimethoxy silyl propyl) urea); compounds having a halogen group (such as 3-chloropropyl trimethoxy silane). Among these compounds, those having an epoxy group are preferable.

Examples of (D) polyepoxide compounds include those disclosed in pages 15–97 of "New Epoxy Resin" written by Hiroshi Kakiuchi, published by Shokodo Co. on May 10, 1985, pages 371–392 of "Basic Chemistry of Synthetic Resins (New Edition)" written by Tadahiro Miwa published by Gihodo Co. in 1975, and in pages 6–29 of "Epoxy Resins" published by McGraw-Hill Book Company in 1957, such as glycidyl ethers of aliphatic polyhydric alcohols (such as ethylene glycol diglycidyl ether, propylene glycol diglycidyl ether, hexamethylene glycol diglycidyl ether, cyclohexanediol diglycidyl ether, glycerol triglycidyl ether, trimethylol propane triglycidyl ether and pentaerythritol tetraglycidyl ether); glycidyl ethers of a polyalkylene glycol (such as polyethylene glycol diglycidyl ether, polypropylene glycol diglycidyl ether and diglycidyl ethers of polytetra methylene glycol); polyglycidyl compounds of polyester {such as polyglycidyl compound of polyester synthesized from polyhydric alcohols (such as ethylene glycol, propylene glycol, butylene glycol, hexamethylene glycol and bis(hydroxy methyl)benzene)) and polycarboxylic acids (such as oxalic acid, adipic acid, butane tricarboxylic acid, maleic acid, phthalic acid, terephthalic acid, isophthalic acid and benzene tricarboxylic acid), diglycidyl compound of polycaprolactam}; polyglycidyl compound of polyamide (such as polyglycidyl compound of polyamide synthesized from polyamines (such as ethylene diamine, diethylene triamine, 1,4-cyclohexane diamine, isophorone diamine and tolylenediamine) and the polycarboxylic acid); bisphenol A type epoxy resins (such as condensates of bisphenol A and epichlorohydrin, ethylene oxide adducts of condensates of bisphenol A and epichlorohydrin and propylene oxide adducts of condensates of bisphenol A and epichlorohydrin); phenol novolac type epoxy resins (such as phenol novolac resin, ethylene oxide adducts of phenol novolac resin and propylene oxide adducts of phenol novolac resin. Among these examples, bisphenol A type epoxy resins are particularly preferable. The epoxide equivalent weight of said polyepoxide compounds (D) is, in general, from 100 to 3,000, preferably from 200 to 2,000.

The ratio of (C) or (D) to the 100 parts by weight of copolymer (A) is, in general, from 0.01 to 20 parts by weight, preferably from 0.1 to 10 parts by weight. When both (C) and (D) are used, the ratio of the sum of (C) and (D) to the 100 parts by weight of (A) is, in general, from 0.02 to 20 parts by weight, preferably from 0.1 to 10 parts by weight.

The production methods for the aqueous dispersion of the present invention include ① a method of emulsion polymerization of ($a_1$) and ($a_2$) in the presence of a water-soluble polymer (B), optionally with (C) and/or (D) contained in ($a_1$), ($a_2$) or (B) and a polymerization initiator in an aqueous medium (such as water, or a mixed medium of water and a water-miscible medium comprising an alcohol solvent such as methanol and isopropanol or a ketone solvent such as acetone) at 30°–100° C.; ② a method of mixing a copolymer (A) solution obtained by copolymerizing ($a_1$) and ($a_2$) in an organic solvent at 30° to 100° C. with water and (B), optionally with (C) and/or (D) as needed, then eliminating the organic solvent at 50° to 80° C. under an ordinary pressure or a reduced pressure.

The method ① is preferable since it provides a copolymer having a high molecular weight. It is also possible after obtaining an aqueous dispersion containing (A) and (B) of the present invention, and further mixing with aqueous dispersion of (C) and/or (D).

In the present invention, a conventional emulsifier can be used together with a water-soluble polymer (B) as long as it does not spoil the objects of the present invention. Examples of such emulsifiers include the following items (xvi) to (xix).

(xvi) anionic emulsifiers

Examples of (xvi) include sodium dodecylbenzene sulfonate, sodium lauryl sulfate ester, sodium alkyl diphenylether disulfonate and sodium polyoxyethylene alkylether sulfate ether.

(xvii) nonionic emulsifiers

Examples of (xvii) include polyoxyethylene alkylphenylether, polyoxyethylene alkylether and polypropylene glycol ethyleneoxide adduct.

(xviii) cationic emulsifiers

Examples of (xviii) include stearyl benzyl dimethyl ammonium chloride and distearyl benzyl dimethyl ammonium chloride.

(xix) polymerizable emulsifiers

Examples of (xix) include sodium alkylallylsulfo succinate and sodium (meth)acryloyl polyoxyalkylene sulfate ester.

These may be used in combinations of two or more.

As a polymerization initiator used to produce a copolymer (A) which comprises a unit derived from ($a_1$) and a unit derived from ($a_2$), or a water-soluble polymer (B), ordinary polymerization initiators described in the following items ① to ④ can be used.

① Persulfate

Examples of ① include ammonium persulfate, sodium persulfate and potassium persulfate.

② Peroxide Compounds

Examples of ② include benzoyl peroxide, lauryl peroxide, t-butyl hydroperoxide and hydrogen peroxide.

③ Azo Compounds

Examples of ③ include azobisisobutyronitrile, azobisisovaleronitrile, azobis(aminodipropane)-2hydrochloride, azobiscyanovaleric acid, azobis{2-methyl-N-(1,1-bis(hydroxymethyl)-2-hydroxyethyl)propionamide} and azobis{2-methyl-N-(hydroxyethyl)propionamide}.

④ Redox Initiator

Examples of ④ include a combination of a peroxide such as ammonium persulfate and sodium bisulfite and a reducing (bi)sulfite; a combination of a peroxide such as ammonium persulfate and an amine compound such as dimethylaminoethanol; and a combination of a peroxide such as hydrogen peroxide and a reducing metal salt such as divalent iron salt.

In the production process of (A) a copolymer having a hydrolyzable silyl group in the present invention, a chain transfer agent may be used at need. And in the production process of a dispersion in the present invention, an electrolyte (such as sodium hydrogencarbonate, sodium tripolyphosphate and potassium chloride) or a pH adjuster (such as aqueous solution of ammonia or sodium hydroxide) may be used.

As a chain transfer agent, conventional agents such as n-lauryl mercaptan, n-dodecyl mercaptan, t-dodecyl mercaptan, γ-mercaptopropyl trimethoxy silane and γ-mercaptopropyl methyldimethoxy silane can be used.

The ratio of the sum of a copolymer (A) and a water-soluble polymer (B) in the dispersion of the present invention is, in general, from 0.1 to 70% by weight, preferably from 30 to 60% by weight. The particle size of dispersoids in an aqueous dispersion of the present invention is, in general, from 0.01 to 10 μm, preferably from 0.1 to 1 μm.

An aqueous dispersion of the present invention may include conventional materials such as pigments, film formation auxiliaries (such as ethylene glycol and n-butyl cellosolve), thickeners (such as hydroxyethyl cellulose and polyvinyl alcohol), dispersants, antifoamers, leveling agents, antiseptics and anti oxidants at need. Based on 100 parts by weight of the sum of a copolymer (A) and a water-soluble polymer (B), the amount of a pigment used is, in general, from 0 to 1,000 parts by weight, preferably 500 parts by weight or less; the ratio of a film formation auxiliary is, in general, from 0 to 500 parts by weight, preferably from 0.5 to 200 parts by weight; the amount of any of a thickener, an antifoamer, a leveling agent, an antiseptic or an antioxident is, in general, from 0 to 30 parts by weight, preferably from 0.5 to 10 parts by weight.

The aqueous dispersions of the present invention form a film due to the adhesion of particles at the time of the medium's evaporation at an ordinary temperature or by heat drying after application, and further form a crosslinked film due to the condensation of silyl groups in the polymer. To facilitate the formation of the crosslinked film, curing catalysts may be used at need. Examples of such curing catalysts include organic titanate compounds (such as isopropyl triisostearoyl titanate, isopropyl tri(dioctylpyrophosphato) titanate, tetraisopropyl di(lauryl phosphite) titanate), organic aluminum compounds (such as acetoalkoxy aluminum diisopropynate), carboxylate type tin compounds (such as tin dioctylate, dibutyl tin dilaurate and dibutyl tin maleate), sulfur containing organic tin compounds (such as dibutyl tin sulfide), dialkyl tin oxides (such as dibutyl tin oxide and dioctyl tin oxide), other carboxylate (such as sodium acetate, zinc caproate, lead octylate and cobalt naphthenate), acid phosphates (such as monomethyl acid phosphate, diethyl acid phosphate and monobutyl acid phosphate), carboxylic acids and acid anhydrides thereof (such as adipic acid, maleic acid, citric acid, itaconic acid, succinic acid, phthalic acid, trimellitic acid, maleic anhydride and phthalic anhydride), amines and salts thereof (such as triethyl amine, dibutyl amine-2-hexoate, cyclic amidines and salts thereof), quaternary ammonium salts (such as tetrabutyl ammonium hydroxide). The amount of a catalyst used is, in general, from 0.01 to 10 parts by weight, preferably from 0.05 to 5 parts by weight based on 100 parts by weight of the total sum of (A) and (B).

Further explanation will be provided referring to the following production examples and examples, but the present invention is not limited thereto. Hereinafter % denotes % by weight.

PRODUCTION EXAMPLE 1

881 g of water and 4.4 g of sodium persulfate (hereinafter abbreviated NAP) were placed in a reaction container having a stirrer, a dropping funnel, a gaseous nitrogen introducing tube, a thermometer and a reflux condenser, and heated to 100° C. while being stirred, with the air of the inside substituted by gaseous nitrogen. Then a mixture of 17 g of 1,1-dimethyl-1-(2-hydroxypropyl)amine methacrylimide (hereinafter abbreviated AI), 34 g of acrylic acid (hereinafter abbreviated AA), and 72 g of 2-hydroxyethyl acrylate (hereinafter abbreviated HEA) was dropped over 1 hour while maintaining the same temperature and then left to react for 1 hour. After cooling the mixture to 30° C. and adding 25% aqueous ammonia to adjust the pH value to be 8.5, an aqueous solution having an amineimide group (content of solid matter of 11.5%) was obtained.

PRODUCTION EXAMPLE 2

883 g of water and 5.1 g of azobis amidinopropane-2hydrochloride were placed in the same reaction container as Production Example 1, and heated to 100° C. while being stirred and the air of the inside substituted by gaseous nitrogen. Then a mixture of 28 g of AI, 14 g of methacrylic acid and 70 g of HEA was dropped over 1 hour while keeping the same temperature and then left to react for 1 hour. After cooling the mixture to 30° C. and adding 25% aqueous ammonia to adjust the pH value to be 8.5, an aqueous solution having an amineimide group (content of solid matter of 11.0%) was obtained.

EXAMPLE 1

206 g of the water-soluble polymer obtained in Production Example 1, 419 g of water and 2.5 g of NAP were placed in the same reaction container as Production Example 1, and heated to 85° C. while being stirred and the air of the inside substituted by gaseous nitrogen. Then a mixture of 48 g of γ-methacryloxy propyl trimethoxy silane (hereinafter abbreviated MPS), 160 g of methyl methacrylate (hereinafter abbreviated MMA), 95 g of n-butyl methacrylate (hereinafter abbreviated BMA), 70 g of n-butyl acrylate (hereinafter abbreviated BA) and 2 g of acrylic acid was dropped over 1 hour and then left to react for 2 hours while maintaining the same temperature. After cooling the dispersed mixture to 30° C. and adding 25% aqueous ammonia to adjust the pH value to be 8.5, an aqueous dispersion (content of solid matter of 40.1%) comprising a copolymer having a silyl group and a water-soluble polymer having an amineimide group was obtained. We evaluated the dispersion with respect to polymerization stability, mechanical stability, and storage stability. Table 3 shows the result of the evaluation.

EXAMPLES 2–7

By the same method as in Example 1, aqueous dispersions of each copolymer were obtained from the materials illustrated in Table 1. In examples 6 and 7, EPSi or EPi828 was used in a mixture with MPS, MMA, BMA, BA and AA. Table 3 shows the result of the evaluation.

COMPARATIVE EXAMPLES 1–6

Except for the point not using an aqueous polymer solution by the same method as in Example 1, aqueous dispersions of each copolymer were obtained from the materials illustrated in Table 2. In Comparative Examples 5 and 6, EPSi or EPi828 was used in a mixture with MPS, MMA, BMA, BA and AA. Table 4 shows the result of the evaluation.

In Table 1 and Table 2, the below-mentioned abbreviations describe the following compounds.

ST: styrene

JS-2: sulfonate-type polymerizable emulsifier ["ELEMINOL JS-2" available from Sanyo Chemical Industries, Ltd.]

EPSi: 3-(trimethoxy silyl)propyl glycidyl ether ["NUCA-187" available from NIPPON UNICAR Co. Ltd.]

EPi828: epoxy resin ["EPICOTE 828" available from Yuka shell Company in Japan]

In Table 3 and Table 4, each item of the evaluation describes the following.

- polymerization stability: measured by the amount produced (% by weight to the aqueous dispersion) of gel or solidified matter during or at the time of completing polymerization.
- mechanical stability: conducted by JIS K6392 (Maron Type) method. solidification rate (%).
- storage stability: after being left at 50° C. for one month, the state of the dispersions was observed visibly. Test pieces were prepared by coating each dispersion onto a glass plate at a thickness of about 30µ, followed by heating at 130° C. for 3 minutes and were observed visibly with respect to the coating appearance.

state
  ◯: no defect was observed
  x : thickening was observed coating appearance
  ◯: no defect was observed
  x: clarity deterioration (compared with the coating just after the production of the dispersion) or occurence of crack was observed As can be seen from the result shown in Table 3, Table 4, the aqueous dispersion of the polymer composition of the present invention has excellent polymerization stability, mechanical stability and storage stability.

TABLE 1

| Material | Example 2 | 3 | 4 | 5 | 6 | 7 |
|---|---|---|---|---|---|---|
| Water-soluble polymer solution Production Example 1 (g) | 260 | | | | 206 | 206 |
| Production Example 2 (g) | | 206 | 206 | 260 | | |
| MPS (g) | 56 | 30 | 30 | 62 | 48 | 48 |
| MMA (g) | 90 | 200 | 200 | 150 | 160 | 160 |
| B A (g) | 130 | 90 | 90 | 100 | 70 | 70 |
| BMA (g) | 90 | 60 | 60 | 40 | 95 | 95 |
| S T (g) | 12 | 0 | 0 | 20 | 0 | 0 |
| A A (g) | 0 | 2 | 2 | 0 | 2 | 2 |
| NAP (g) | 3 | 2.5 | 2 | 3 | 3 | 3 |
| A I (g) | 0 | 0 | 0 | 0 | 0 | 0 |
| HEA (g) | 0 | 0 | 0 | 0 | 0 | 0 |
| JS-2 (g) | 0 | 0 | 0 | 0 | 0 | 0 |
| EPSi (g) | 0 | 0 | 0 | 0 | 4 | 0 |
| EPi828 (g) | 0 | 0 | 0 | 0 | 0 | 4 |
| Water (g) | 362 | 412 | 412 | 368 | 362 | 368 |

TABLE 1-continued

| Material | Example 2 | 3 | 4 | 5 | 6 | 7 |
|---|---|---|---|---|---|---|
| Total (g) | 1003 | 1002.5 | 1002 | 1003 | 950 | 956 |
| Solid matter content (%) | 40.5 | 39.9 | 39.9 | 39.5 | 40.3 | 40.2 |

TABLE 2

| Material | Comparative Example 1 | 2 | 3 | 4 | 5 | 6 |
|---|---|---|---|---|---|---|
| Water-soluble polymer solution Production Example 1 (g) | 0 | 0 | 0 | 0 | 0 | 0 |
| Production Example 2 (g) | | | | | | |
| MPS (g) | 48 | 56 | 8 | 48 | 56 | 8 |
| MMA (g) | 160 | 86 | 180 | 160 | 86 | 180 |
| B A (g) | 115 | 130 | 134 | 115 | 130 | 134 |
| BMA (g) | 30 | 90 | 50 | 30 | 90 | 50 |
| S T (g) | 0 | 12 | 0 | 0 | 12 | 0 |
| A A (g) | 16 | 16 | 16 | 16 | 16 | 16 |
| NAP (g) | 3 | 3 | 3 | 3 | 3 | 3 |
| A I (g) | 8 | 0 | 0 | 8 | 0 | 0 |
| HEA (g) | 24 | 6 | 6 | 24 | 6 | 6 |
| JS-2 (g) | 2 | 4 | 6 | 2 | 4 | 6 |
| EPSi (g) | 0 | 0 | 0 | 2 | 4 | 6 |
| EPi828 (g) | 0 | 0 | 0 | 2 | 4 | 6 |
| Water (g) | 597 | 600 | 600 | 597 | 600 | 600 |
| Total (g) | 1003 | 1003 | 1003 | 1007 | 1011 | 1015 |
| Solid matter content (%) | 40.1 | 39.4 | 39.5 | 40.0 | 39.8 | 39.7 |

TABLE 3

| Item of Evaluation | Example 1 | 2 | 3 | 4 | 5 | 6 | 7 |
|---|---|---|---|---|---|---|---|
| Polymerization Stability | 0.2 | 0.1 | 0.1 | 0.1 | 0.2 | 0.3 | 0.3 |
| Mechanical Stability | 0 | 0 | 0 | 0 | 0 | 0 | 0 |
| Storage Stability State | ◯ | ◯ | ◯ | ◯ | ◯ | ◯ | ◯ |
| Storage Stability Film | ◯ | ◯ | ◯ | ◯ | ◯ | ◯ | ◯ |

TABLE 4

| Item of Evaluation | Comparative Example 1 | 2 | 3 | 4 | 5 | 6 |
|---|---|---|---|---|---|---|
| Polymerization Stability | 35 | 13 | 0.5 | 3.5 | 13 | 0.5 |
| Mechanical Stability | 0.5 | 1.5 | 0.2 | 0.5 | 1.5 | 0.2 |
| Storage Stability State | ◯ | x | x | ◯ | x | x |
| Storage Stability Film | ◯ | x crack | x crack | ◯ | x crack | x crack |

The emulsion or aqueous dispersion of the polymer composition of the present invention has the following advantageous effects:

(1) It has good polymerization stability (no generation of gel).

(2) It has good mechanical stability.

(3) It is not liable to cause gelation during storage and it has good stability of a hydrolyzable silyl group in particles of the dispersion.

(4) It cures at an ordinary temperature.

(5) Its coating film has good weatherproof, heat resistance, water resistance, and hardness properties.

INDUSTRIAL APPLICABILITY

By having the above-mentioned advantageous effects, the emulsion or dispersion of the copolymer having a silyl group of the present invention is useful for various applications such as paints, adhesives, primers and binders. Concretely, suitable applications include waterproof paints or weatherproof paints for construction materials (for example, inorganic plates such as glass, slate, ceramics, metal plates such as aluminum, wood plates and plastic plates), paints for autoclaved concrete, acid-rain resistant paints, antifouling paints, corrosion resistant paints, water-repelling agents for inorganic construction materials (water absorption preventing agents), primers or sealers for inorganic construction materials, adhesives for glass, electrodeposition paints, automobile paints, mending paints for automobiles, paints for automobile parts, hard coating materials, can coating materials (such as aluminum cans), rust-inhibiting paints, mold releasing agents, plastic coating materials (such as a coating material for polyvinyl chloride articles such as polyvinyl chloride sheets used for desk mats and paints for polyvinyl chloride wall papers), moisture-proof coating materials for electorical components or electronic parts, insulation coatings, back-coating materials for ink ribbons or magnetic tapes, ink binders and releasing agents for information paper (such as sublimation-type heat-transfered image reception paper), binders for glass fibers, adhesives for non-woven fabrics and coating agents for water-proofing or glazing of papers.

We claim:

1. An aqueous dispersion of a polymer composition comprising (A) a copolymer which comprises ($a_1$) a unit derived from a vinyl monomer having a hydrolyzable silyl group and ($a_2$) another vinyl monomer copolymerizable with ($a_1$), and (B) a water-soluble polymer having an amineimide group, the copolymer (A) and the water-soluble polymer (B) being different from each other, with the water-soluble polymer (B) not containing a hydrolyzable silyl group, and the copolymer (A) not containing an amineimide group.

2. The aqueous dispersion according to claim 1, wherein the amount of said polymer composition included in the aqueous dispersion is from 0.1 to 70% by weight.

3. The aqueous dispersion according to claim 1, wherein said polymer composition comprises from 99.5 to 50% by weight of said copolymer (A) and from 0.5 to 50% by weight of said water-soluble polymer (B).

4. The aqueous dispersion according to claim 1, wherein said copolymer (A) is a copolymer comprising from 0.5 to 50% by weight of a unit derived from ($a_1$) a vinyl monomer having a hydrolyzable silyl group and from 50 to 99.5% by weight of ($a_2$) a unit derived from another copolymerizable vinyl monomer.

5. The aqueous dispersion according to claim 1, wherein ($a_1$) a vinyl monomer having a hydrolyzable silyl group is a (meth)acryloxyalkylalkoxy silane or a polyurethane oligomer which has a vinyl group and an alkoxy silyl group.

6. The aqueous dispersion according to claim 1, wherein ($a_2$) another copolymerizable vinyl monomer is alkyl(meth) acrylate or an aromatic vinyl monomer.

7. The aqueous dispersion according to claim 1, wherein said water-soluble polymer (B) is a water-soluble polymer comprising ($b_1$) a unit derived from a vinyl monomer having an amineimide group and ($b_2$) a unit derived from a vinyl monomer without an amineimide group and without a hydrolyzable silyl group.

8. The aqueous dispersion according to claim 7, wherein the ratio of ($b_1$) a unit derived from a vinyl monomer having an amineimide group and ($b_2$) a unit derived from a vinyl monomer without an amineimide group is 1:0–50 (by weight).

9. The aqueous dispersion according to claim 7, wherein ($b_2$) a vinyl monomer without an amineimide group is at least one selected from the group consisting of a vinyl monomer having a hydroxyl group, a vinyl monomer having an amino group, a vinyl monomer having a carboxylic group and a vinyl monomer having a sulfonic acid group.

10. The aqueous dispersion according to claim 7, wherein ($b_2$) a vinyl monomer without an amineimide group comprises a combination of a vinyl monomer having a hydroxyl group and a vinyl monomer having a carboxylic group.

11. The aqueous dispersion according to claim 1, further including (C) an unradically polymerizable compound having a hydrolyzable silyl group.

12. The aqueous dispersion according to claim 11, wherein said non-radically polymerizable compound (C) is a silane compound having an epoxy group.

13. The aqueous dispersion according to claim 1, further including (D) a polyepoxide compound.

14. The aqueous dispersion according to claim 13, wherein the polyepoxide compound (D) is a polyepoxide compound having an epoxide equivalent weight of from 100 to 3,000.

15. The aqueous dispersion according to claim 13, wherein the polyepoxide compound (D) is bisphenol A type epoxy resin.

16. The aqueous dispersion according to claim 1, wherein ($a_2$) another copolymerizable vinyl monomer is selected from the group consisting of (i) alkyl or cycloalkyl (meth) acrylates having an alkyl group of from 1 to 30 carbon atoms or a cycloalkyl group of from 5 to 7 carbon atoms, (ii) vinyl monomers containing a hydroxy group, (iii) aromatic vinyl monomers, (iv) alkyl or cycloalkyl vinyl ethers, (v) vinyl esters, (vi) monomers having a nitrile group, (vii) monomers having an amide group, (viii) vinyl monomers having an epoxy group, (ix) vinyl monomers having a siloxane group, (x) vinyl monomers having a perfluoroalkyl group of from 3 to 30 carbon atoms, (xi) vinyl monomers having an amino group, (xii) vinyl monomers having a carboxylic acid group, (xiii) vinyl monomers having a sulfonic acid group, (xiv) polyvinyl monomers, and (xv) polymerizable oligomers having a vinyl group.

17. The aqueous dispersion according to claim 1, wherein said water-soluble polymer (B) is selected from the group consisting of polymers comprising units derived from ($b_1$) a vinyl monomer having an amineimide group, and copolymers comprising a unit derived from ($b_1$) the vinyl monomers and a unit derived from ($b_2$) vinyl monomers without an amineimide group, other than a vinyl monomer having hydrolyzable silyl group.

* * * * *